US008209052B2

(12) United States Patent
Lauria et al.

(10) Patent No.: US 8,209,052 B2
(45) Date of Patent: Jun. 26, 2012

(54) HIGH PERFORMANCE DIFFERENTIAL ACTUATOR FOR ROBOTIC INTERACTION TASKS

(75) Inventors: Michel Lauria, Sherbrooke (CA); Marc-Antoine Legault, Saint-Jérôme (CA); Patrick Giguére, Ascot (CA); Frédéric Gagnon, Sherbrooke (CA); François Michaud, Sherbrooke (CA); Marc-André Lavoie, Saguenay (CA)

(73) Assignee: Societe de Commercialisation de Produits de la Recherche Appliquee-Socpra-Sciences et Genie, S.E.C., Quebec (CA)

( * ) Notice: Subject to any disclaimer, the term of this patent is extended or adjusted under 35 U.S.C. 154(b) by 1460 days.

(21) Appl. No.: 11/694,123

(22) Filed: Mar. 30, 2007

(65) Prior Publication Data

US 2007/0241696 A1 Oct. 18, 2007

Related U.S. Application Data

(60) Provisional application No. 60/788,132, filed on Mar. 31, 2006.

(51) Int. Cl.
*H01L 41/04* (2006.01)
(52) U.S. Cl. ............ 700/245; 318/116; 318/566; 601/5; 434/262
(58) Field of Classification Search .................. 318/116, 318/566, 623; 703/2; 601/5; 700/245; 434/262
See application file for complete search history.

(56) References Cited

U.S. PATENT DOCUMENTS

| | | | | | |
|---|---|---|---|---|---|
| 5,442,270 | A | * | 8/1995 | Tetsuaki | 318/568.22 |
| 5,579,440 | A | * | 11/1996 | Brown | 706/14 |
| 5,650,704 | A | * | 7/1997 | Pratt et al. | 318/623 |
| 5,929,587 | A | * | 7/1999 | Kang | 318/623 |
| 6,002,184 | A | * | 12/1999 | Delson et al. | 310/14 |
| 6,029,099 | A | * | 2/2000 | Brown | 700/245 |
| 6,204,622 | B1 | * | 3/2001 | Tsuruta | 318/609 |
| 6,312,398 | B1 | * | 11/2001 | Cencer | 601/40 |
| 6,377,011 | B1 | * | 4/2002 | Ben-Ur | 318/566 |
| 6,566,777 | B2 | * | 5/2003 | AbuAkeel | 310/209 |
| 6,604,995 | B2 | * | 8/2003 | Dillon et al. | 460/111 |
| 6,606,844 | B2 | * | 8/2003 | Dillon et al. | 56/14.6 |
| 6,612,101 | B2 | * | 9/2003 | Dillon | 56/14.6 |
| 6,680,729 | B1 | * | 1/2004 | Shahoian et al. | 345/156 |
| 6,701,236 | B2 | * | 3/2004 | Ulyanov et al. | 701/40 |
| 6,705,871 | B1 | * | 3/2004 | Bevirt et al. | 434/262 |

(Continued)

OTHER PUBLICATIONS

Zinn et al, Jun. 2004, IEEE Robotics & Automation Magazine, Playing it Safe: A new Actuation Concept for Human Friendly Robot Design.*

(Continued)

*Primary Examiner* — Thomas G. Black
*Assistant Examiner* — Wae Louie
(74) *Attorney, Agent, or Firm* — Fay Kaplun & Marcin, LLP

(57) ABSTRACT

The mechanical differential actuator according to the present invention comprises a mechanical differential having three mechanicals ports. A first transducer with a low impedance is coupled to a first port, a second transducer with a high impedance is coupled to a second port, and the mechanical load is coupled to the third port. The mechanical differential actuator enables controlling a force and a speed at a load coupled thereto through a known relation between the force and the speed. Moreover, the mechanical differential actuator presents a compact structure enabling the transfer of a large force relative to its volume.

35 Claims, 13 Drawing Sheets

U.S. PATENT DOCUMENTS

| | | | | |
|---|---|---|---|---|
| 7,027,965 | B2* | 4/2006 | Hannaford et al. | 703/2 |
| 7,219,855 | B2* | 5/2007 | Hamamoto et al. | 244/72 |
| 7,249,951 | B2* | 7/2007 | Bevirt et al. | 434/262 |
| 7,251,593 | B2* | 7/2007 | Dariush et al. | 703/11 |
| 7,252,644 | B2* | 8/2007 | Dewald et al. | 601/5 |
| 7,283,893 | B2* | 10/2007 | Hara et al. | 700/248 |
| 7,350,787 | B2* | 4/2008 | Voss | 280/5.5 |
| 7,367,958 | B2* | 5/2008 | McBean et al. | 602/16 |
| 7,386,366 | B2* | 6/2008 | Dariush | 700/245 |
| 7,390,309 | B2* | 6/2008 | Dariush | 601/5 |
| 7,396,337 | B2* | 7/2008 | McBean et al. | 601/5 |
| 7,480,600 | B2* | 1/2009 | Massie et al. | 703/6 |
| 7,650,204 | B2* | 1/2010 | Dariush | 700/245 |
| 7,691,154 | B2* | 4/2010 | Asgeirsson et al. | 623/26 |
| 7,731,670 | B2* | 6/2010 | Aguirre-Ollinger et al. | 601/5 |
| 7,870,808 | B2* | 1/2011 | Asai | 74/490.06 |
| 2005/0007059 | A1* | 1/2005 | Chew et al. | 318/623 |
| 2007/0241696 | A1* | 10/2007 | Lauria et al. | 318/116 |

OTHER PUBLICATIONS

Hogan et al., "Impedence and Interaction Control,", CRC Press, LLC, 2005, pp. 19-24.

Fasse et al., "A Novel Variable Mechanical-Impedance Electromechanical Actuator," Dynamic Systems and Control, DSC_vol. 51, vol. 1, ASME 1994, pp. 311-318.

Aghili et al., "Development of a High Performance Direct-Drive Joint," 2002, 8 sheets.

Robinson et al., "Design and Analysis of Series Elasticity in Closed-Loop Actuator Force Control," Doctoral Thesis @ MIT, Jun. 2000, pp. 1-123.

Bicchi et al., "Variable Stiffness Actuators for Fast and Safe Motion Control," 2003, 5 sheets.

Zhou et al., "Property Analysis for Series MR-Fluid Damper Actuator System," Proceedings of the 2004 IEEE Conf. on Robotics, Automation and Mechatronics, Singapore, Dec. 2004, pp. 560-565.

Zinn et al., "Playing it Safe", IEEE Robotics and Automation Magazine, Jun. 2004, pp. 12-21.

Morrell, "Parallel Coupled Micro-Macro Actuators", A.I. Technical Report No. 1563, MIT, Jan. 1996, pp. 1-121.

Website, http://www.harmonicdrive.net/, Harmonic Drive LLC, 2 sheets, Jun. 6, 2007.

Website, http://www.axsys.com/app.php., Axsys Technologies, 1sheet, Jun. 6, 2007.

* cited by examiner

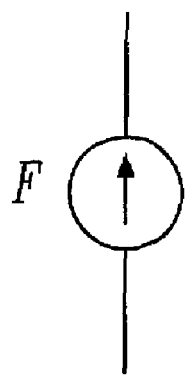
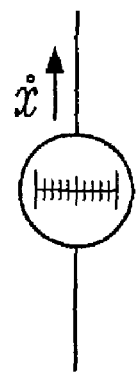
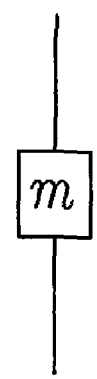
Fig-1a  Fig-1b  Fig-1c
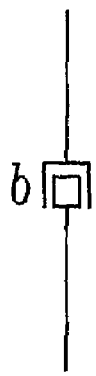
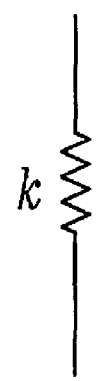
Fig-1d  Fig-1e
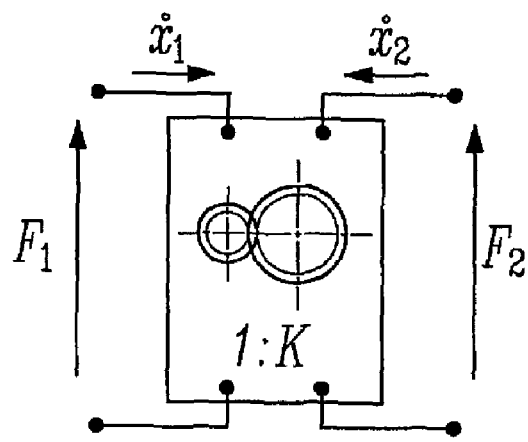
Fig-2

HIGH PERFORMANCE DIFFERENTIAL ACTUATOR FOR ROBOTIC INTERACTION TASKS

PRIORITY CLAIM

Priority is claimed to U.S. Provisional Patent Application Ser. No. 60/788,132 filed on Mar. 31, 2006 Entitled "High Performance Differential Actuator for Robotic Interaction Tasks". The entire disclosure of this application is expressly incorporated herein by reference.

FIELD

The present invention relates to differential actuators. More specifically, but not exclusively, the present invention is concerned with a high performance differential actuator for robotic interaction tasks.

BACKGROUND

It is well known to those of ordinary skill in the art that an actuator is a mechanism that transforms a particular form of energy, for example electrical, pneumatic or hydraulic energy into mechanical power to induce, in particular but not exclusively, motion. The motion produced by an actuator can be a rotational motion, a linear motion, a combination of rotational and linear motions, or any other type of motion.

An actuator is described as "high performance" when the actuator has (a) the capability to produce a high output mechanical power in a compact volume, and/or (b) a high efficiency of energy conversion, and/or (c) dedicated sensors to measure its internal kinetic states (forces and/or torques) and its internal kinematic states (positions and/or speeds and/or accelerations).

Also, a robot with n degree(s) of freedom is connected to a load via n power exchange, interaction port(s), i.e. one per degree of freedom. The state of each interaction port is defined via two variables: a generalized force/torque and a generalized speed. Independent control of these two interaction state variables issued from a same interaction port is not possible. For that reason, two "ideal" actuators are defined for each interaction port, one for each of the two interaction state variables (generalized force/torque and generalized speed), as a model for this concept.

A so called "ideal actuator" would control perfectly (a) the force/torque profile or (b) the speed profile transmitted to the load. There would be no limitation of frequency and/or amplitude for the desired (a) force/torque or (b) speed profile that can be controlled by this "ideal actuator". Any (a) motion perturbation or (b) force perturbation of the load, at any frequency and amplitude, does not affect the ideal performance of the "ideal actuator". Such an "ideal actuator" would constitute an ideal source of (a) force/torque or (b) speed.

Real actuators designed to have a performance as close as possible to that of ideal sources of speed are generally implemented using very high mechanical impedance components in series with a transducer. Such a real actuator may include, for example, a hydraulic transducer and a very high ratio mechanical transmission using gears.

A hydraulic transducer has an intrinsic high impedance property. Accordingly, a hydraulic transducer is well suited to build speed sources having performances close to those of ideal sources of speed.

A very high ratio mechanical transmission using gears has an intrinsic high impedance property because of friction and inertia amplification. Thus, a high ratio gearbox placed between a transducer and a load will help to reject perturbation forces/torques coming from the load. Consequently, a high ratio gearbox is well suited to build speed sources having performances close to those of ideal sources of speed.

Real actuators designed to have a performance as close as possible to that of ideal sources of force/torque are generally implemented using very low mechanical impedance components in series with a transducer. Such real actuators may include, for example, direct drive actuators and force/torque controlled actuators.

A direct drive actuator may comprise an electromechanical transducer that is directly linked to a load, for example a load shaft without gearbox. In general, such an electromechanical transducer has a known relationship between the winding current and the output force/torque. Fast force/torque control can be performed with a feed forward control scheme using an analog current controller. The collocation of a current sensor with the electromechanical transducer allows very high bandwidth operation.

A force/torque controlled actuator may be an actuator including a high impedance force/torque sensor in series with a real source of speed with high mechanical impedance. The force/torque is controlled by simple feedback control. The bandwidth of such a system is often limited by the non-collocation of the force/torque sensor and the transducer.

High performance variable impedance actuators for robotic interaction tasks have been developed for applications where the power exchange with the robot's environment is not negligible.

A large class of robotic applications requires low power exchange during interaction between the robot and its environment. For these simple tasks such as pick and place or slow assembly of simple parts, a precise interaction model between a robot and its environment is easily available. Thus, from a control point of view, feedback based control of movement or force is generally sufficient for the robot to perform these tasks. Both motion and force controllers attempt to reach the same objectives, though each focuses on only one port variable, i.e., pure force control or pure motion control. To perform these tasks, robot designers implement actuators of which the performance is close to the performance of "ideal actuators". However, for applications where the power exchange with the robot's environment is not negligible and involving complex robotic tasks such as manipulation, locomotion, haptics, etc., the lack of knowledge of precise interaction models, the difficulty to precisely measure a robot port's associated physical quantities (force/torque, speed, etc.) in real time and the non-collocation of sensors and transducers have negative effects on the performance and stability of robots when using simple motion and/or force/torque controllers.

To cope with these issues, an approach named <<interaction control>> that refers to regulation of the robot's dynamic behavior at the ports of interaction with the environment has been proposed. Generally stated, in this particular case, "interaction control" involves specifying a dynamic relationship between speed and force/torque at the port, and implementing a control law that attempts to minimize deviation from this relationship [1].

Implementation of machines capable to precisely control interaction with the environment begins with the use of actuators specially designed for that purpose. It has been found that these high performance actuators are difficult to implement, particularly within compact volumes and large force/torque and power outputs. These actuators include, in particular but not exclusively, impedance controllable direct drive actuators; series dynamic actuators [4]; variable stiffness actuators [5]; variable damper actuators [6]; and parallel coupled micro-macro actuators.

Regarding specifically rotational actuators, none of the above implementations is adapted for compact product integration and mass production.

SUMMARY

According to the present invention, there is provided a mechanical differential actuator for interacting with a mechanical load, and a corresponding method.

More specifically, in accordance with the present invention, there is provided a mechanical differential actuator for interacting with a mechanical load comprising: a first transducer; a second transducer; and a mechanical differential having three interaction ports, including a first interaction port coupled to the first transducer, a second interaction port coupled to the second transducer, and a third interaction port coupled to the load.

According to a second aspect of the present invention, there is provided a method of actuating a mechanical load comprising: providing a mechanical differential having three interaction ports; providing a first transducer; providing a second transducer; coupling the first transducer to a first interaction port of the mechanical differential; coupling the second transducer to a second interaction port of the mechanical differential; and coupling the load to a third interaction port of the mechanical differential.

The foregoing and other objects, advantages and features of the present invention will become more apparent upon reading of the following non-restrictive description of illustrative embodiments thereof, given by way of example only, with reference to the accompanying drawings.

BRIEF DESCRIPTION OF THE DRAWINGS

In the appended drawings:

FIGS. 1a, 1b, 1c, 1d and 1e are symbols used in mechanical impedance diagrams, more specifically, respectively an ideal source of force, an ideal source of speed, a mass, a viscous damper and a spring;

FIG. 2 is an impedance diagram representing an ideal mechanical speed reducer, which is used in other mechanical impedance diagrams;

DETAILED DESCRIPTION

Figure 3:
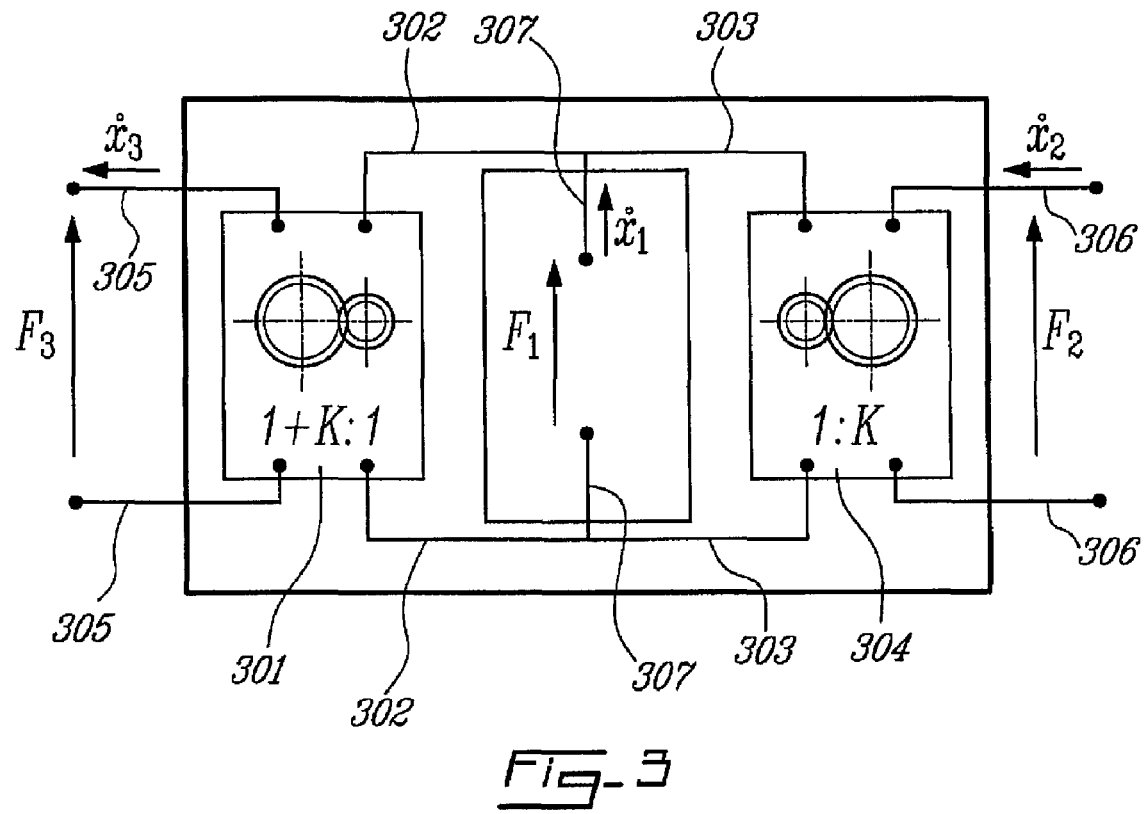
FIG. 3 is an impedance diagram representing an ideal mechanical differential having 3 ports and comprising 2 ideal mechanical speed reducers.

Non-restrictive illustrative embodiments of the actuator according to the present invention will now be described.

Generally speaking, the actuator according to the non-restrictive illustrative embodiments of the present invention comprises a mechanical differential having 3 mechanical ports, an intrinsically high impedance transducer coupled to the first mechanical port and an intrinsically low impedance transducer coupled to the second mechanical port. The third mechanical port interacts with a load. The mechanical differential along with the transducers define a dynamic relationship between force/torque and speed applied to the load at the mechanical port connected to this load.

Since impedance diagrams are used to represent the non-restrictive illustrative embodiments of the actuator according to the present invention, some mechanical components of these impedance diagrams will be first described.

Impedance Diagrams

Mechanical Differential

A mechanical differential is a mechanism that provides a coupling of 3 mechanical dipoles to respectively 3 mechanical ports of the mechanical differential. Basically, any 2-port mechanism that provides force/torque amplification by a factor K can be used in a <<3-port>> differential configuration mode.

As known to those of ordinary skill in the art, the kinematical relationship between the 3 rotational/linear speeds in a mechanical differential configuration is given by the Willis equation:

$$\dot{x}_1 + K \cdot \dot{x}_2 = (1+K) \cdot \dot{x}_3$$

wherein:

$x_i$ is the angular or linear position of the $i^{th}$ mechanical dipole coupled to the $i^{th}$ port, i=1, 2, 3;

$\hat{x}_i$ is the angular or linear velocity of the $i^{th}$ mechanical dipole coupled to the $i^{th}$ port, i=1, 2, 3; and K is an amplification factor.

The kinetic relationships between the 3 forces/torques are given by the following equations:

$$\begin{cases} F_2 = K \cdot F_1 \\ F_3 = (K+1) \cdot F_1 \end{cases}$$

wherein:

$F_i$ is the force/torque exerted on the $i^{th}$ mechanical dipole coupled to the $i^{th}$ port, i=1, 2, 3.

Mechanical Impedance

A mechanical impedance can be associated to any mechanism having one degree of freedom. Mechanical impedance Z is a complex quantity that determines dynamic properties of a mechanism from the interface point of view. It can be seen as a transfer function of a black box model of the following system:

$$Z(j\omega) = \frac{\text{Force}(j\omega)}{\text{Speed}(j\omega)}$$

wherein j is the square root of −1; and ω is an angular frequency.

It is to be noted that two mechanical components that are physically connected in series are represented by their equivalent force/tension impedance symbol connected in parallel in an impedance diagram. Similarly, two mechanical components that are physically connected in parallel are represented by their equivalent force/tension impedance symbol connected in series in an impedance diagram.

Mechanical Impedance Diagram

Stationary linear systems can be modeled with impedance diagrams. Electrical impedance diagrams are abundantly used to analyze electrical circuits in steady state operation. In the following description, mechanical impedance diagrams are used to describe the non-restrictive illustrative embodiments of the present invention. For example, a force/tension analogy is used to model differential actuators. In order to interpret the mechanical impedance diagrams, one should note that:

- a force/torque can be associated with a tension;
- a speed can be associated with a current;
- an ideal source of force/torque can be associated with an ideal source of tension;
- an ideal source of speed can be associated with an ideal source of current;
- a mass can be associated with an inductor;
- a spring can be associated with a capacitor; and
- a viscous damper can be associated with a resistor.

In this respect, FIGS. 1a, 1b, 1c, 1d and 1e are symbols used in the mechanical impedance diagrams. More specifically, FIG. 1a represents an ideal source of force/torque, FIG. 1b represents an ideal source of speed, FIG. 1c represents a mass, FIG. 1d represents a viscous damper and FIG. 1e represents a spring.

Ideal Mechanical Speed Reducer

An ideal mechanical 2-port component has no internal inertia, no friction loss and is infinitely stiff. It can be associated with an ideal electric transformer. FIG. 2 shows an impedance diagram representing an ideal mechanical 2-port speed reducer.

Equations associated with an ideal speed reducer as shown in FIG. 2 are given by:

$$\begin{cases} F_2 = K \cdot F_1 \\ \dot{x}_1 = -K \cdot \dot{x}_2 \end{cases}$$

Ideal Mechanical Differential

FIG. 3 shows an ideal mechanical differential, which is a mechanical 3-port component that has no internal inertia, no friction loss and is infinitely stiff. It can be described with an equivalent mechanical impedance diagram using two ideal speed reducers as illustrated in FIG. 2. As noted hereinabove, an ideal speed reducer has 2 ports. In the ideal mechanical differential, one 302 of the 2 ports of the first speed reducer 301 is coupled to one 303 of the 2 ports of the second speed reducer 304. In this manner, each of the 2 speed reducers 301 and 304 is left with a free port 305 and 306, respectively. In addition to these two free ports 305 and 306, a third free port 307 connected to the ports 302 and 303 enables an interaction with the two speed reducers 301 and 304.

Referring to FIG. 3, the ideal mechanical differential is characterized by the following set of equations:

$$\begin{cases} \dot{x}_1 + K \cdot \dot{x}_2 = (1+K) \cdot \dot{x}_3 \\ F_2 = K \cdot F_1 \\ F_3 = (K+1) \cdot F_1 \end{cases}$$

where subscript 1 refers to the third free port 307, and subscripts 2 and 3 refers to respectively the two free ports 306 and 305, respectively.

Real Source of Force/Torque

Figure 4:
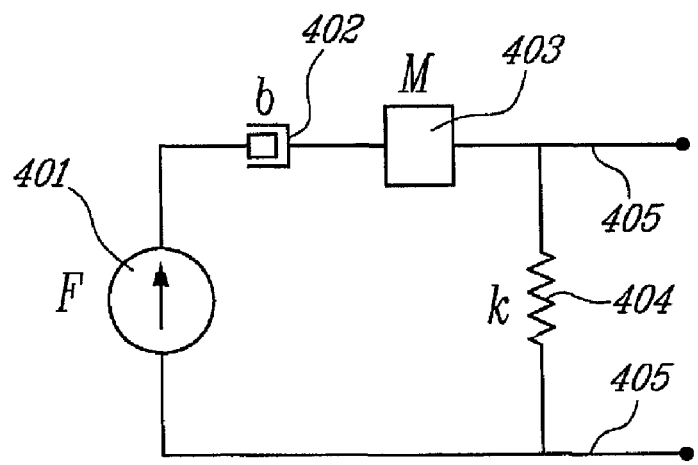
FIG. 4 is an impedance diagram representing a direct drive actuator.

Ideal sources of force/torque are impossible to build in practice. However, direct drive actuators have characteristics close to those of ideal sources of force/torque because they have a very low mechanical impedance, i.e. low inertia, low friction, etc. As illustrated in FIG. 4, a direct drive actuator can be represented by a source of force/torque 401 connected as illustrated in FIG. 4 with a viscous damper 402, a mass 403 and a spring 404. The force/torque output 405 is located across the spring 404. The damping coefficient b of the viscous damper 402 and the value M of the mass 403 should be as small as possible and the stiffness value k of the spring 404 should be as high as possible.

Figure 5:
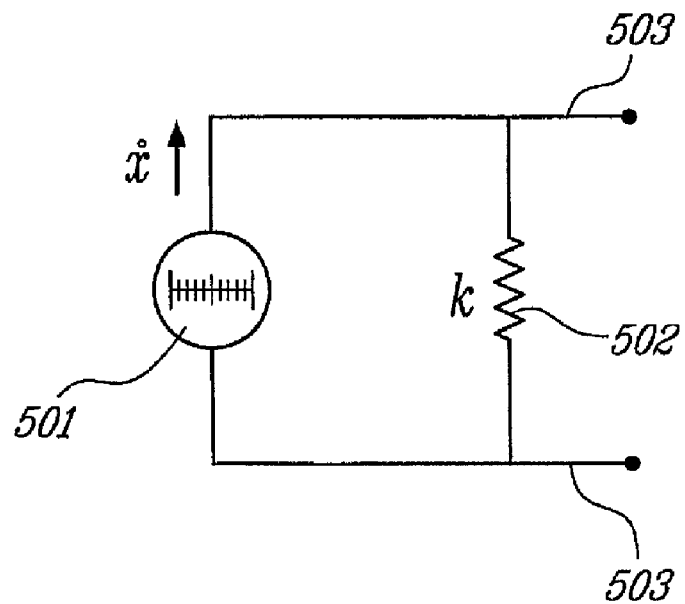
FIG. 5 is an impedance diagram representing an ideal <<Series Elastic Actuator>> using a mechanical spring in series with an ideal source of speed.

A real source of force/torque can also be built, as illustrated in FIG. 5, by combining a mechanical spring 502 having a low stiffness k connected with a real source of speed 501. The force/torque output 503 is located across the spring 502. An architecture as illustrated in FIG. 5 is known as <<Series Elastic Actuator>>. As well known to those of ordinary skill in the art, in this architecture, an adequate feedback force/torque controller (not shown; this type of controller is well known to those of ordinary skill in the art and for that reason will not be further described in the present specification) is required to build the real source of force/torque. The resulting bandwidth of the source of force/torque is determined by the spring stiffness k and by the bandwidth of the source of speed 501.

Real Source of Speed

Figure 6:
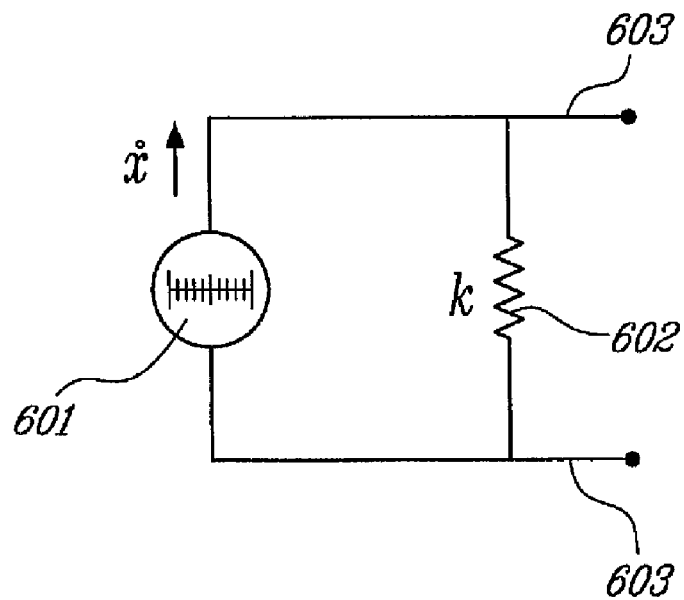
FIG. 6 is an impedance diagram representing a hydraulic actuator.

Ideal sources of speed are impossible to build in practice. However, hydraulic actuators, as shown on FIG. 6, have characteristics close to ideal sources of speed because they have a very high mechanical impedance, i.e. high stiffness. As illustrated in FIG. 6, the hydraulic actuator is represented by a source of speed 601 connected with a spring 602. The source of speed output 603 is located across the spring 602. The stiffness value k should be as high as possible.

Figure 7:
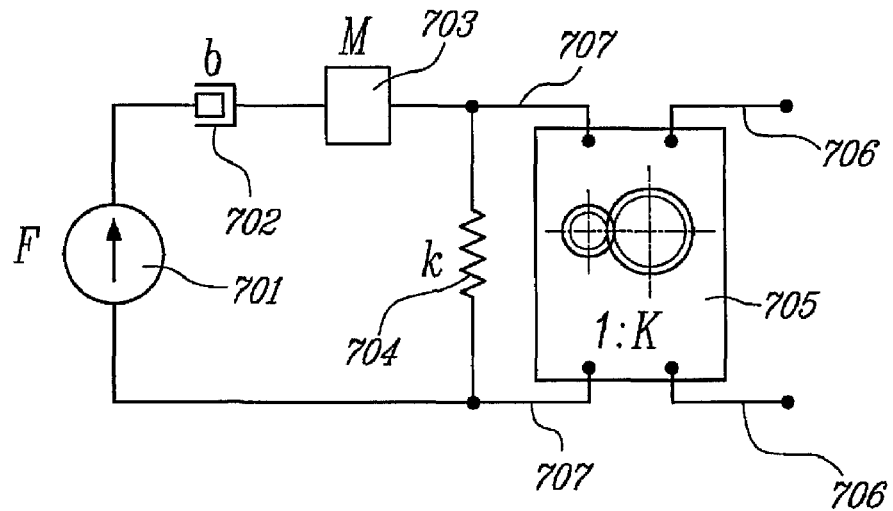
FIG. 7 is an impedance diagram representing the implementation of a real source of speed.

A real source of speed can also be built by combining a very high ratio gearbox in series with a real source of force/torque, as illustrated in FIG. 7. The real source of speed of FIG. 7 is represented by a real source of force/torque 701 as illustrated in FIG. 7 connected with a viscous damper 702, a mass 703 and a spring 704. The real source of force/torque of FIG. 7 also comprises a speed reducer 705 having a first port connected across the spring 704 and a second port 706 forming the speed output. In FIG. 7, a small impedance of the real source of force 701 is multiplied by the square of the gearbox ratio K (ratio of the speed reducer 705) providing high mechanical impedance in open loop. Moreover, as known to those of ordinary skill in the art, an open loop mechanical impedance can be increased with an appropriate feedback speed controller (not shown; this type of controller is well known to those of ordinary skill in the art and for that reason will not be further described in the present specification).

General Description of an Actuator According to Non-Restrictive Illustrative Embodiments of the Present Invention The non-restrictive illustrative embodiments of the actuator according to the present invention provide compact implementation designs for high performance actuators. These actuators are particularly, but not exclusively, suitable for integration in robotic mechanisms and comprise a mechanical differential. Although differential coupling between an intrinsically high impedance transducer and an intrinsically low impedance transducer provides similar benefits as serial coupling of the transducers, differential coupling enables interesting design implementation possibilities, particularly, but not exclusively, for rotational actuators.

Differential Actuation

Figure 8:
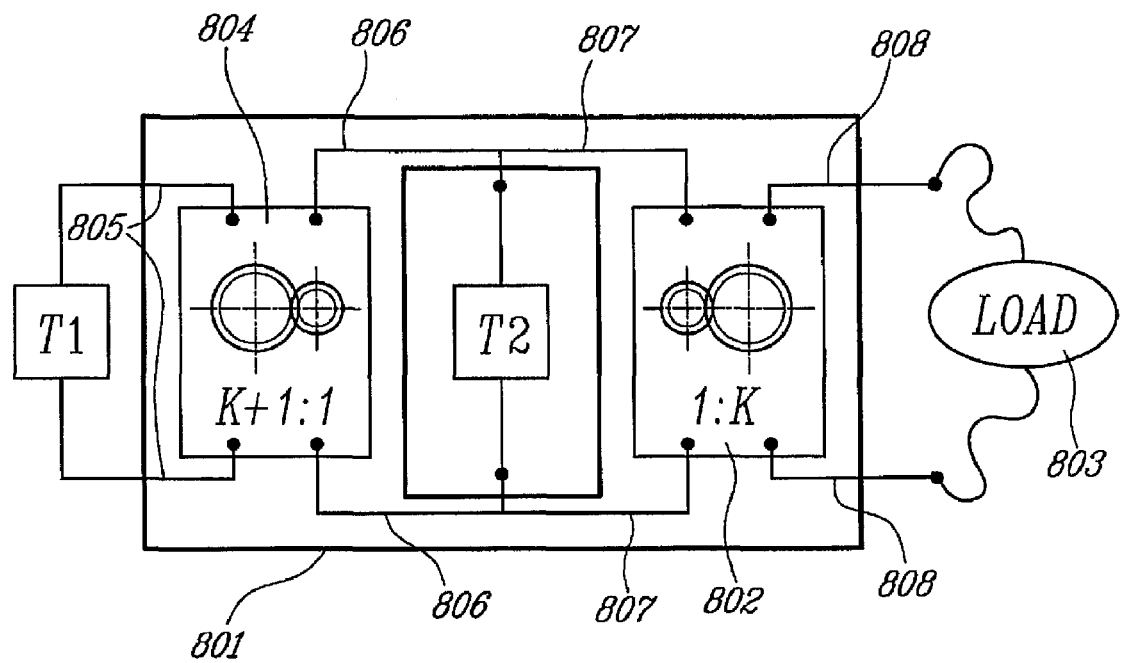
FIG. 8 is an impedance diagram representing a differential actuator according to an illustrative embodiment of the present invention.

Referring now to FIG. 8, an actuator according to an illustrative embodiment of the present invention comprises a mechanical differential 801 as described hereinabove with reference to FIG. 3, to which two transducers T1 and 72 are coupled so as to create a compact high performance actuator, suitable in particular but not exclusively for robotic interaction tasks.

More specifically, the mechanical differential 801 comprises a first mechanical speed reducer 804 of ratio 1:K+1 as illustrated in FIG. 2 with ports 805 and 806 and a second mechanical speed reducer 802 of ratio 1:K as illustrated in FIG. 2 with ports 807 and 808. Transducer T1 is connected to port 805 of the mechanical speed reducer 804 while a load 803 is connected to port 808 of the mechanical speed reducer 802. Ports 806 and 807 are interconnected and both connected to transducer T2.

The principle of operation of a differential actuator according to an illustrative embodiment of the present invention is not scale dependant. For example, micro actuators using MEMS technology or macro actuators using standard components can be built still using the same principle of operation.

Physical implementation of the mechanical differential 801 of the actuator of FIG. 8 does not change the principle of operation of the differential actuation process. Possible implementations of the mechanical differential include the use of, amongst others, a standard gearbox, a harmonic drive, a cycloidal gearbox, a bar mechanism, a cable mechanism and any other types of mechanism that implement a differential function between 3 mechanical ports.

In the non-restrictive illustrative embodiment of FIG. 8, transducer T2 is a controllable source of speed 901 advantageously presenting a high intrinsic mechanical impedance $Z_2$ (see FIGS. 9-12).

Since a high performance differential actuator is characterized by the expression:

$$(K+1)^2 Z_2 >> Z_1.$$

where $Z_1$ and $Z_2$ are equivalent mechanical impedances associated to transducers T1 and T2, respectively, and K is the above mentioned amplification factor, the mechanical differential 801 acts as a speed reducer (speed reducer 802) for transducer T2 from a load point of view. Thus, if the intrinsic mechanical impedance of transducer 72 is low, a gear ratio and an intrinsic friction of the mechanical speed reducer 802 of the mechanical differential 801 will contribute to increase an equivalent impedance $Z_{eq}$ of transducer 72 seen from the load 803. It is not necessary to exert a precise control on the exact value of the mechanical impedance of transducer T2, since this does not affect the principle of operation of the differential actuation process. Taking into consideration the foregoing teaching of the specification in Section "*Real source of speed*", possible implementations of transducer T2 comprise, for example:

A hydraulic transducer (T2) connected to a low gear ratio differential (K=1 implemented by the mechanical speed reducer 802);

An ultrasonic actuator (T2) connected to a low gear ratio differential (K=1 implemented by the mechanical speed reducer 802);

A direct drive electromechanical transducer (T2) connected to a high gear ratio differential (K>>1 implemented by the mechanical speed reducer 802) and with a feedback speed controller (not shown; this type of controller is well known to those of ordinary skill in the art and for that reason will not be further described in the present specification); and Any other actuator sub-system designed and suitable to act as a controllable source of speed.

Depending of the nature of transducer T1 and taking into consideration the teaching of the above Section "Real source of force/torque", four categories of high performance differential actuators can be distinguished.

Category 1: Differential Actuator with Constant Impedance Dynamic Reaction

Figure 9:
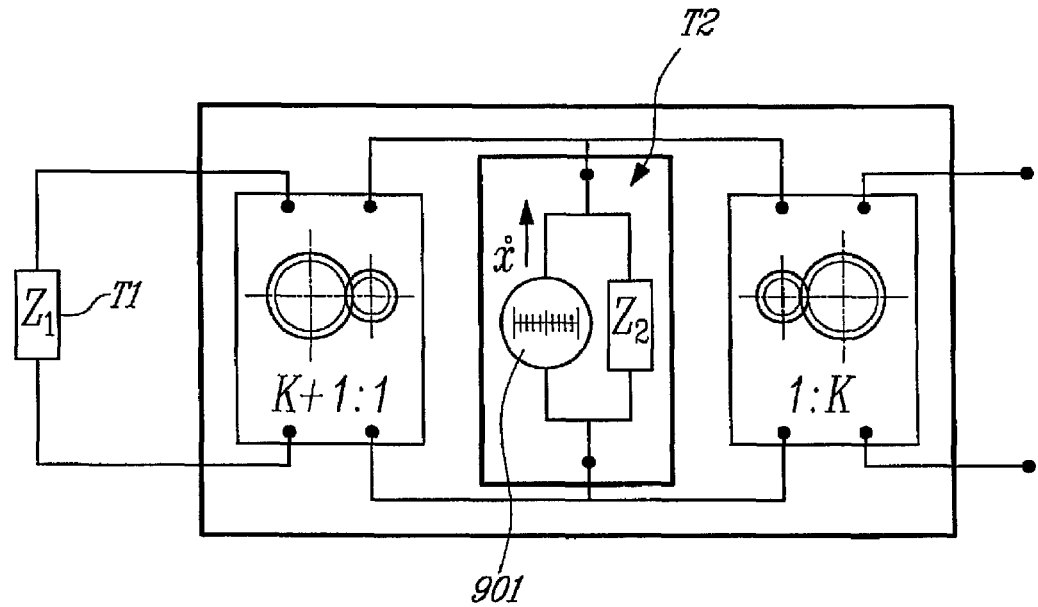
FIG. 9 is an impedance diagram representing a differential actuator with constant impedance dynamic reaction according to an illustrative embodiment of the present invention.

Transducer T1 has a constant mechanical impedance Z1, as shown in FIG. 9. The intrinsic mechanical impedance Z1 of transducer T1 is task dependant and is calculated during the phase of engineering of the actuator. The output force can be controlled within a limited amplitude and bandwidth depending on the mechanical impedance Z1 and the speed bandwidth of transducer T2. Examples of possible physical implementations of transducer T1 comprise, amongst others:

A passive mechanical spring;
A passive mechanical damper;
A passive mechanical inertia; and
A combination of passive mechanical elements such as springs, dampers and inertia elements.

Category 2: Force Controllable Differential Actuator

Figure 10:
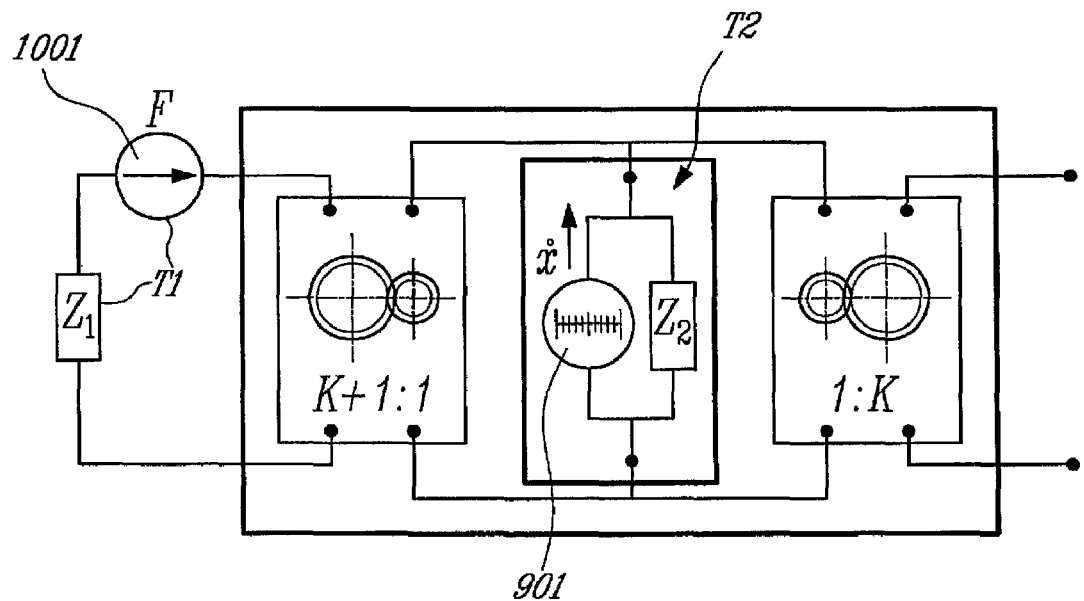
FIG. 10 is an impedance diagram representing a force controllable differential actuator according to an illustrative embodiment of the present invention.

Transducer T1 comprises an active source of force/torque 1001 with very low intrinsic impedance Z1, as shown in FIG. 10. Possible physical implementations of transducer T1 include, amongst others:

Force controlled direct drive electromechanical transducers;
Force controlled pneumatic transducers;

Any actuation sub-system acting as a controlled source of force/torque.

Figure 11:
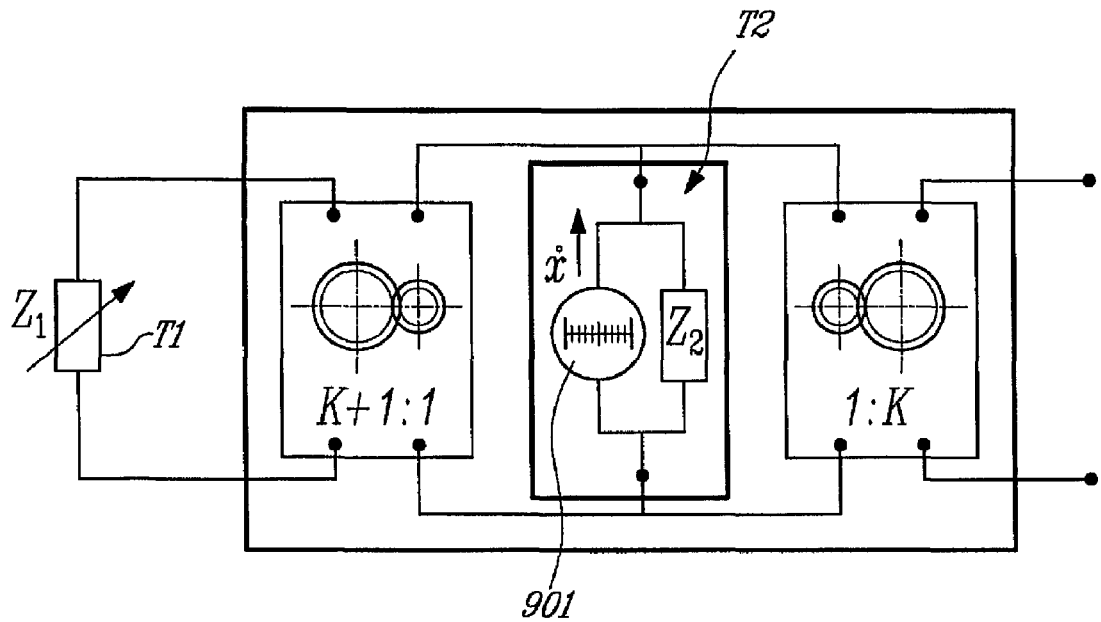
FIG. 11 is an impedance diagram representing a differential actuator according to an illustrative embodiment of the present invention, with variable and controllable impedance dynamic reaction.

Category 3: Differential Actuator with Variable and Controllable Impedance Dynamic Reaction Transducer T1 has a variable and controllable impedance element, as shown in FIG. 11. Possible physical implementations of variable and controllable impedance element include, amongst others:

A controlled magneto-rheological damper;

An controlled electro-rheological damper;

A controlled mechanism acting as a variable stiffness spring;

A direct drive electromechanical transducer controlled with a feedback of movement state variables of transducer T1 (position, speed, acceleration) to implement virtual impedance;

A controlled magnetic particle brake;

A controlled magnetic brake based on the hysteresis effect;

A controlled stack of piezoelectric actuators acting on friction disks; and

Any mechanical component with variable and controllable mechanical impedance.

Figure 12:
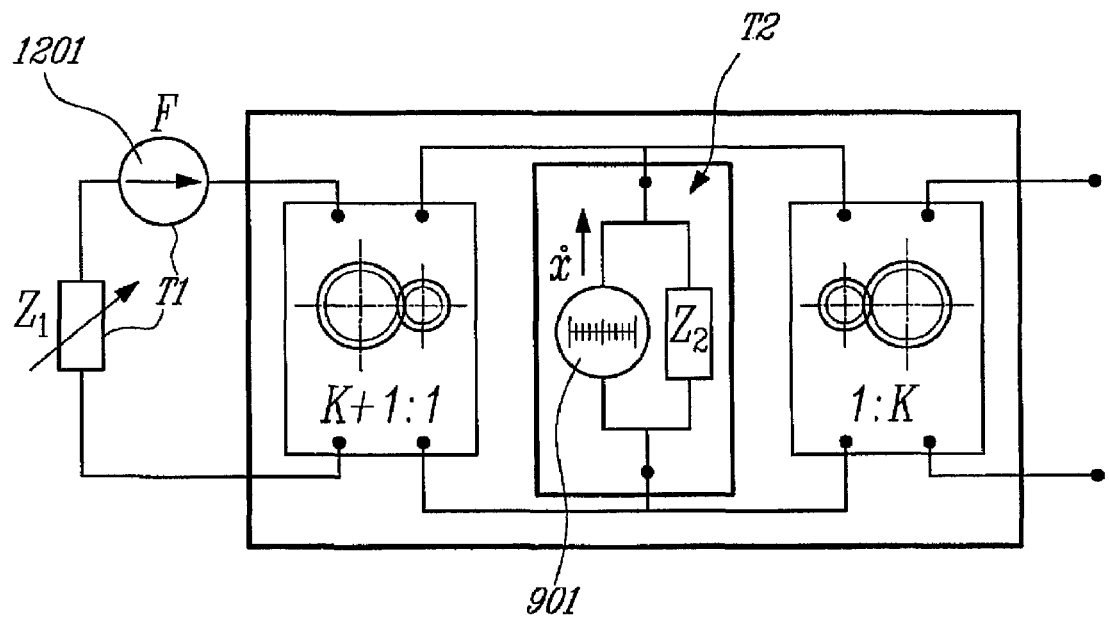
FIG. 12 is an impedance diagram representing a force controllable differential actuator according to an illustrative embodiment of the present invention, with variable and controllable impedance dynamic reaction.

Category 4: Force Controllable Differential Actuator with Variable and Controllable Impedance Dynamic Reaction As shown in FIG. 12, transducer T1 has a variable and controllable impedance element $Z_1$ connected with an active source of force/torque 1201 with very low intrinsic impedance. Possible physical implementations of transducer T1 include, amongst others:

A direct drive electromechanical transducer with a <<2-portion based>> control scheme. One portion implements the <<source of force/torque>> contribution while the other portion implements the virtual impedance contribution. The two contributions are added inside a controller avoiding the physical implementation of two distinct transducers; and Any actuation subsystem acting as a controlled source of force/torque (category 2) acting in parallel with any mechanical component with variable and controllable mechanical impedance (category 3).

Key Property of a Differential Actuator According to the Illustrative Embodiments of the Present Invention A differential actuator represented by the impedance diagram of FIG. 8 behaves similarly to two electrical transformers connected in parallel with transducers T1 and T2, having respectively two equivalent mechanical impedances $Z_1$ and $Z_2$. Then, the total equivalent mechanical impedance $Z_{eq}$ of the actuator of FIG. 8 seen from a load point of view is given by:

$$Z_{eq} = Z_1 \frac{K^2}{(K+1)^2} // Z_2 K^2 = \frac{Z_1 Z_2 K^2}{(K+1)^2 Z_2 + Z_1}$$

As indicated in the foregoing description, a high performance differential actuator is characterized by the following relation:

$$(K+1)^2 Z_2 >> Z_1.$$

Accordingly, the impedance $Z_{eq}$ can be approximated by:

$$Z_{eq} \cong \frac{K^2}{(K+1)^2} \cdot Z_1.$$

Therefore, a property of a differential actuator according to the illustrative embodiment of FIG. 8 is that there is a precise known relationship between the mechanical impedance $Z_{eq}$ of the differential actuator and the mechanical impedance $Z_1$ of transducer T1. The mechanical impedance $Z_2$ of transducer T2, which is in general very difficult to model, does not influence the mechanical impedance $Z_{eq}$ of the differential actuator. As a result, an interaction control between the differential actuator and the load 803 can be performed solely with impedance and/or force/torque control of transducer T1. The aforementioned four categories of differential actuators provide four different examples as to implementing interaction control, i.e. force/torque and/or constant/variable impedance interaction control.

Advantages of Differential Actuation

Figure 13:
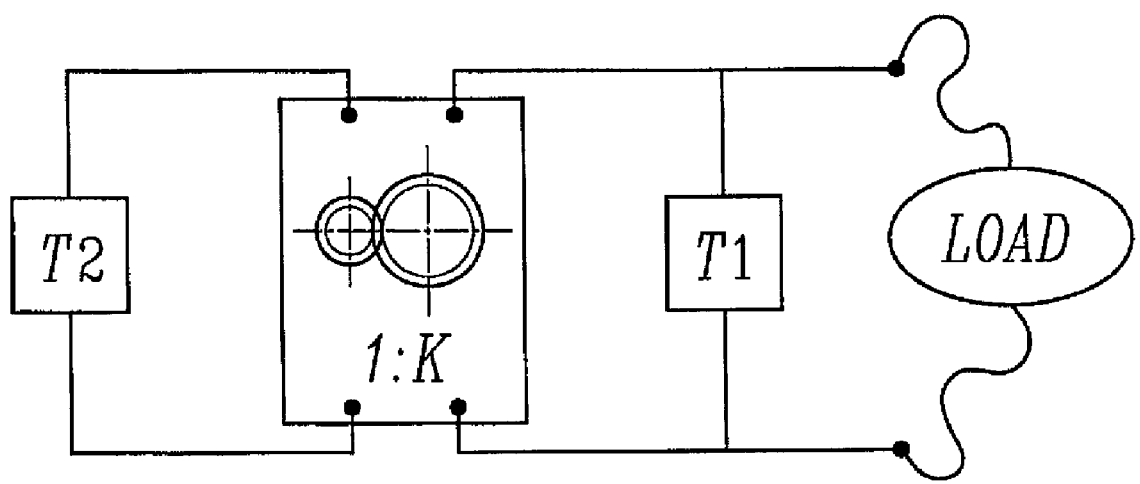
FIG. 13 is an impedance diagram representing a representation of a serial actuator according to an illustrative embodiment of the present invention.

Differentially coupling two transducers is quasi equivalent to serial coupling when computing the impedance seen from the load. In a "force/tension" impedance diagram of a "serial impedance actuator" as illustrated in FIG. 13, transducers T1 and T2 are connected in parallel.

Different categories of "serial impedance actuators" have been proposed in the patent literature, for example in references [9] and [10]. Several particular implementations are described and claimed, in particular linear serial elastic actuators.

Differential coupling offer implementation advantages compared with serial coupling. In particular, high performance rotational actuators are best implemented using a differential coupling between transducers T1 and T2 than using a serial coupling. An additional advantage, amongst others, comprises a more compact and simpler design as demonstrated by the examples of implementation described in the following description.

Physical Implementations

Implementations of a Mechanical Differential

Any speed reduction mechanism can be used to implement the mechanical speed reducer(s) of a mechanical differential actuator according to the present invention. Examples of speed reduction mechanisms comprise, amongst others, standard gearboxes, cycloidal gearboxes, bar mechanisms, cable mechanisms, and any other mechanism capable of implementing the mechanical function of speed reducer. The difference between a speed reducer and a mechanical differential can be understood by looking at what is connected to the three mechanical ports of the differential actuator. The two simple bar mechanisms of FIGS. 14 and 15 can be used to illustrate this conceptual difference.

Figure 14:
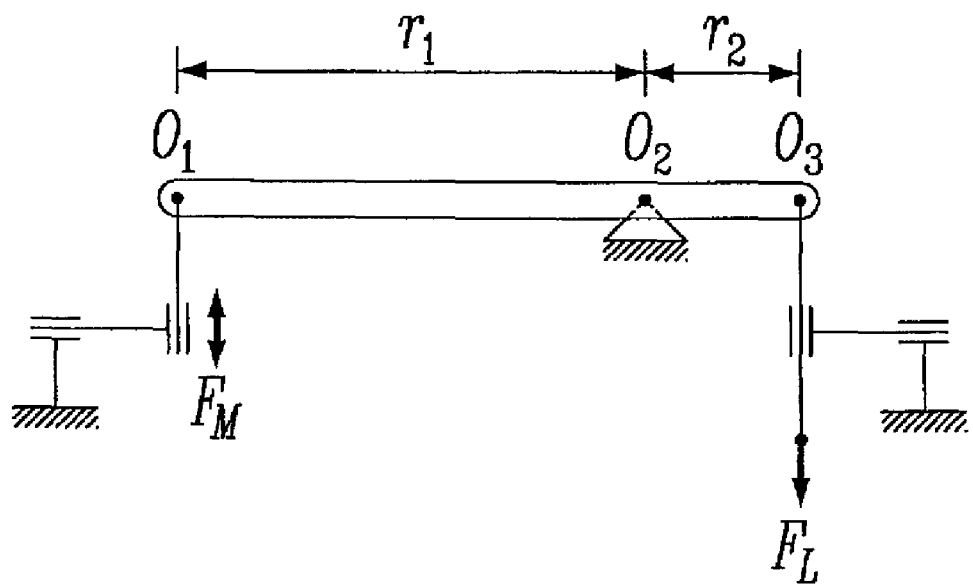
FIG. 14 is schematic diagram of a bar mechanism used in a speed reducer configuration mode.

FIG. 14 shows a mechanical speed reducer comprising 3 mechanical ports respectively connected to an input transducer $O_1$, a fixed chassis $O_2$ and a load $O_3$.

Figure 15:
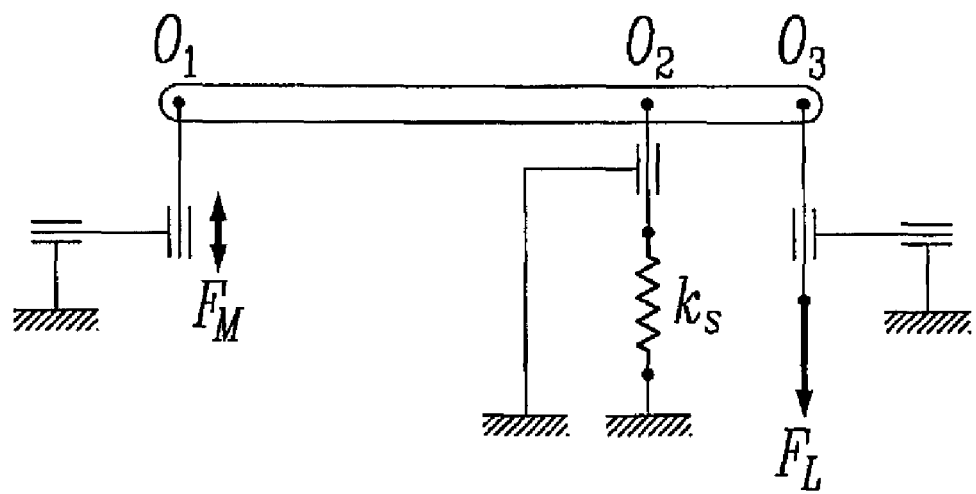
FIG. 15 is a schematic diagram of a bar mechanism used in a differential configuration mode.

In contrast, FIG. 15 illustrates a differential actuator according to an illustrative embodiment of the present invention, comprising 3 mechanical ports respectively connected to transducer T1 ($O_1$), transducer T2 ($O_2$) and a load $O_3$.

Use of a harmonic drive technology to implement a differential mechanical function of a rotational differential actuator provides a very compact and simple design. As can be seen from FIG. 16, the 3 building components of a harmonic drive, i.e. the wave generator WG, the flexible spline FS and the circular spline CS, can be bought separately from the company Harmonic Drive LLC, Peabody, USA. This hollow shaft system allows for the implementation of at least 3 different possible embodiments of rotational differential actuators according to the present invention.

More specifically, a harmonic drive may be viewed as a mechanical differential including 3 ports, namely its three building components WG, FS and CS. Since the operation of a harmonic drive is believed to be well known to those of ordinary skill in the art and that such drive systems are readily available on the market, the harmonic drive and its principle of operation will not be further discussed in the present specification.

The at least 3 possible implementations of rotational differential actuators according to illustrative embodiments the present invention and using the harmonic drive of FIG. 16 will now be described with reference to FIGS. 17a, 17b and 17c.

Figure 17C:
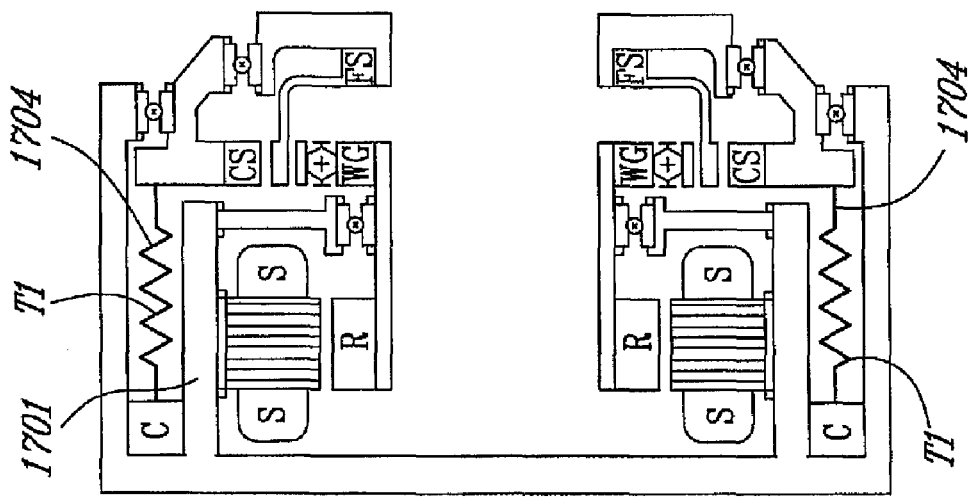
FIG. 17a, 17b and 17c are schematic diagrams of 3 possible implementations of a rotational differential actuator according to an illustrative embodiment of the present invention, using a hollow shaft harmonic drive, wherein the zigzag symbol represents transducer T1, for example a torsion spring, a rotational damper, a limited angle torque motor, etc.
Figure 17B:
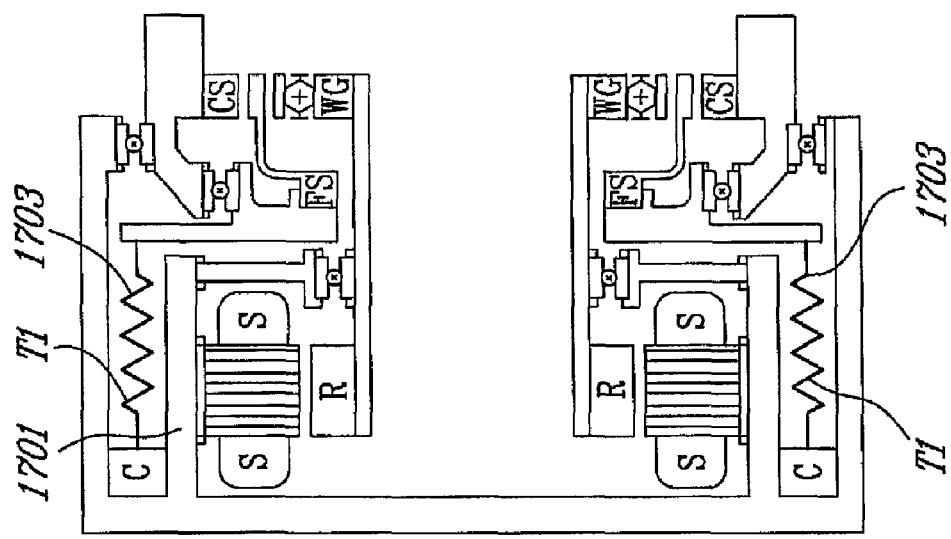
Figure 17A:
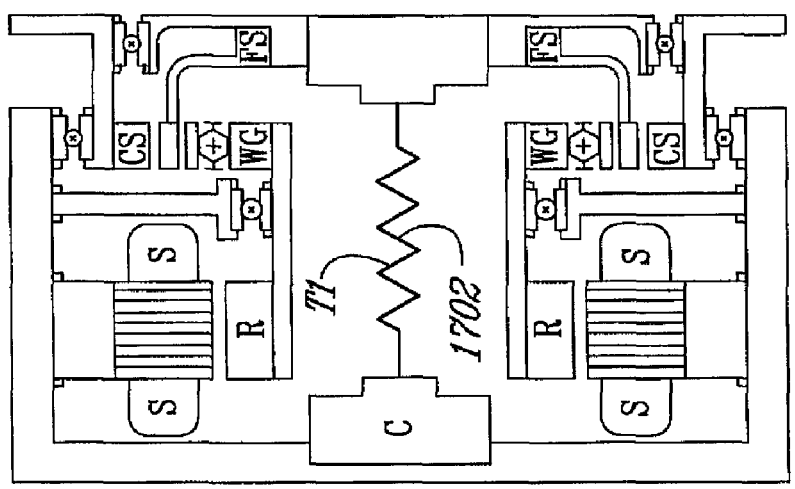

In the 3 implementations of FIGS. 17a-17c, transducer T1 is respectively a torsion spring 1702, a constant/variable rotational damper 1703 and a limited angle torque motor 1704. Transducer T2 is a rotational direct drive brushless motor in the 3 cases. A non-rotating sensor C measures the torque output of the mechanical differential actuator.

Implementation 1

Figure 16:
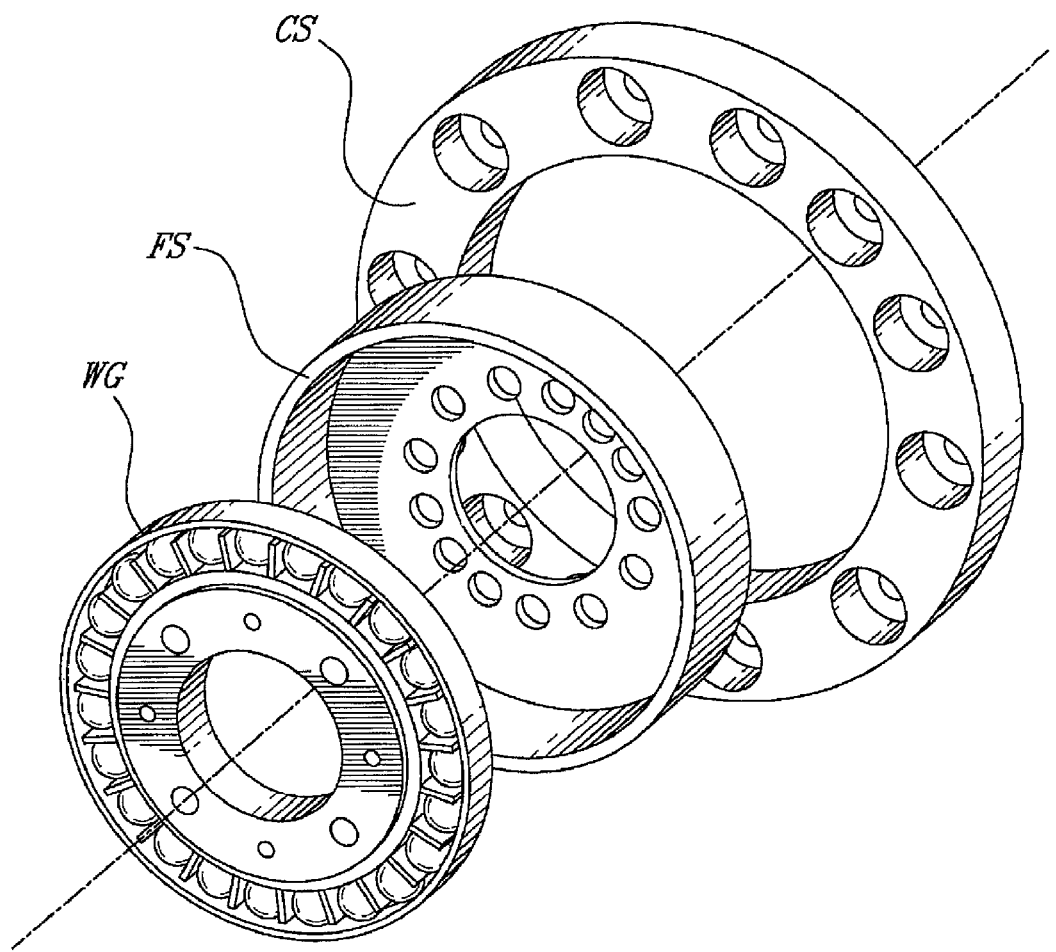
FIG. 16 is a perspective view of the 3 building components of a harmonic drive system comprising, from left to right, a wave generator (WG), the flexible spline (FS) and the circular spline (CS)

FIG. 17a illustrates a first possible design of rotational differential actuator using a hollow shaft harmonic drive as illustrated in FIG. 16 wherein transducer T1 is a torsion spring 1702.

In FIG. 17a, transducer 72 comprises a rotor R connected to the wave generator WG of the harmonic drive. The moving end of transducer T1 is connected to the flexible spline FS. The output of the actuator is the circular spline CS. This design allows transducer T1 to be integrated inside the rotor R of transducer 72.

Implementation 2

FIG. 17b illustrates a second possible design of rotational differential actuator using a hollow shaft harmonic drive as illustrated in FIG. 16 wherein transducer T1 is a rotational damper 1703.

In FIG. 17b, transducer T2 comprises a rotor R connected to the wave generator WG of the harmonic drive. The moving end of transducer T1 is connected to the flexible spline FS. The output of the actuator is the circular spline CS. This design allows transducer T1 to be integrated around the stator 1701 of transducer 72.

Implementation 3

FIG. 17c illustrates a third possible design of rotational differential actuator using a hollow shaft harmonic drive as illustrated in FIG. 16 wherein transducer T1 is a limited angle torque motor 1704.

As illustrated in FIG. 17c, transducer T2 comprises a rotor R connected to the wave generator WG of the harmonic drive. The moving end of transducer T1 is connected to the circular spline CS. The output of the actuator is the flexible spline FS. This design allows transducer T1 to be integrated around the stator 1701 of transducer 72.

Rotational Differential Elastic Actuator (DEA)

Figure 18:
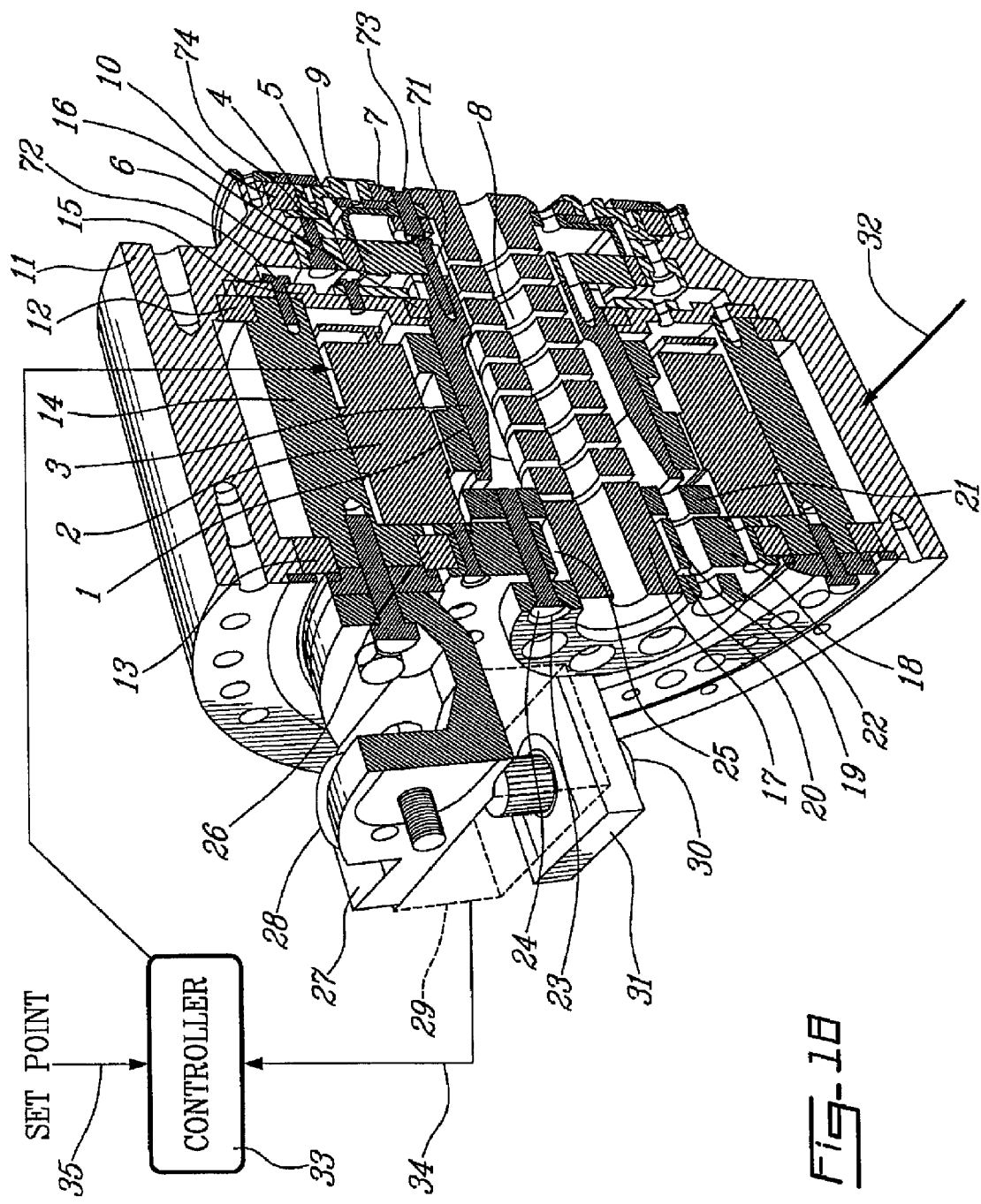
FIG. 18 is a perspective, cross sectional (in a vertical plane) view of a rotational differential elastic actuator according to an illustrative embodiment of the present invention.
Figure 19:
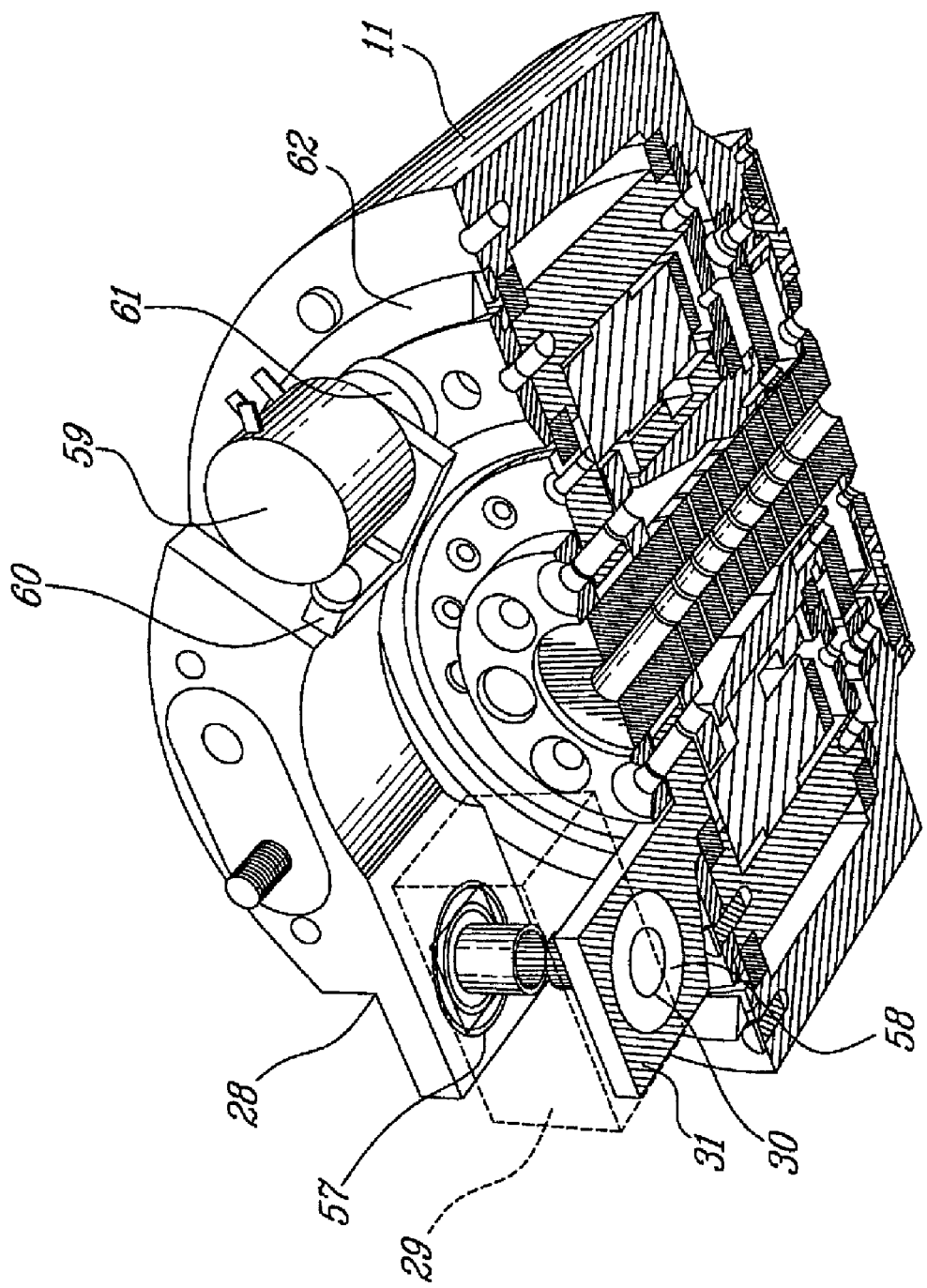
FIG. 19 is a perspective, cross sectional (in a horizontal plane) view of a rotational differential elastic actuator according to an illustrative embodiment of the present invention.

Referring to FIGS. 18 and 19, a rotational differential elastic actuator (DEA) according to a non-restrictive illustrative embodiment of the present invention will be described. The DEA of FIGS. 18 and 19 generally follows implementation 1 described hereinabove and comprises a transducer T1 of above category 1 formed by a passive mechanical torsion spring 8.

The DEA includes:
- a transducer T2 formed of a frameless brushless motor composed of a rotor 1 and stator 2,
- a mechanical differential in the form of a hollow shaft harmonic drive composed of a wave generator 4, a flexible spline 5 and a circular spline 6; and
- a transducer T1 formed by a passive mechanical torsion spring 8.

The rotor 1 of the motor is mounted to a shaft 3, itself mounted to the wave generator 4 via fasteners such as 71. The stator 2 is fixedly mounted to a housing 14 of the motor. The shaft 3 is rotatably connected to the housing 14 via bearings 16 mounted to a ring 15 itself mounted to the housing 14 through fasteners such as 72.

A first end 7 of the torsion spring 8 is secured to the flexible spline 5 via fasteners such as 73. The first end 7 of the torsion spring 8 is also secured to a ring 9. A second end 17 of the spring 8 is mounted to a ring 18. The ring 18 is rotatably mounted to the housing 14 via a bearing 26 which is designed to prevent radial and axial movement of this ring 18. Indeed, bearing 26 absorbs both axial and radial reactions developed at the end 17 of the spring 8 when it transmits a torque to an external load (not shown).

More specifically, the end 17 of the torsion spring 8 is mounted to the circular ring 18 through 2 locking elements 20 and 25. Circular rings 21 and 22 combined with fasteners 23 (only one being shown) generate an axially oriented pressure applied to locking elements 20 and 25. Resulting friction forces applied to surfaces 19 and 24 enable transmission of torque from the end 17 of the spring 8 to the ring 18.

The circular spline 6 is mounted to an output shaft 11 via fasteners such as 74. The output shaft 11 is rotatably mounted to the housing 14 via bearings 12 and 13. Bearings 10 are also interposed between the output shaft 11 and the ring 9.

The housing 14 is fixed with respect to the ground by means of a bracket 27. A force/torque sensor 29 includes a first end 28 mounted to the bracket 27 via spherical bearing 57 (FIG. 19). The ring 18 includes an outwardly protruding plate member 31 to which a second end 30 of the force/torque sensor 29 is mounted through a spherical bearing 58 (see FIG. 19). Spherical bearings 57 and 58 ensure that only tension and compression efforts are transmitted to force/torque sensor 29.

As can be seen from FIG. 19, a rotary position sensor 59 measures the angular position of the output shaft 11. For that purpose, a pinion gear 61 is mounted on an input shaft of this sensor 59, and the gear 61 is driven by an annular internal gear 62, which is directly mounted and centered on the output shaft 11. The angular position measured is supplied to the controller 33 to monitor the angular position of the output shaft 11.

A controller 33 receives force/torque data from the force/torque sensor 29 and angular position data from the rotary position sensor 59 and controls the rotation of the rotor 1 by controlling the electrical energy supplied to the stator 2. A force/torque set point 35 required by the system's user is also supplied to the controller 33. Such a controller 33 is well known to those of ordinary skill in the art and for that reason will not be further discussed.

When a voltage is applied to a winding of stator 2 by the controller 33, the rotor 1 and associated shaft 3 begin to rotate and actuate the wave generator 4 of the harmonic drive.

In operation, when an external torque load 32 is applied to output shaft 11 while no voltage is applied to the winding of the stator 2, the output shaft 11 rotates and drives circular spline 6 and flexible spline 5. Flexible spline 5 then drives the end 7 of the torsion spring 8 which axially deforms in a reversible manner. The end 17 is immobilized because of the high rigidity of the force/torque sensor 29. While the end 7 continues to deviate from its initial angular position which is detected by the angular position sensor 59, a mechanical reaction torque starts to raise inside the torsion spring 8. The process continues until a force equilibrium is achieved between the external load 32 applied to output shaft 11 and an internal mechanical reaction torque built inside torsion spring 8. Electric signals produced by force/torque sensor 29 and supplied to the controller 33 are a direct measurement of the external applied load 32.

To unload the system and decrease applied torque 32 to zero, the wave generator 4 needs to be rotated by rotor 1 in the appropriate direction so angular deviation of the end 7 of the torsion spring 8 is reduced to zero, which is detected by the controller 33 through both the force/torque sensor 29 and the angular position sensor 59.

Vice versa, if a desired force/torque 32 applied by output shaft 11 to an external load (not shown) connected to this output shaft needs to be raised, the wave generator 4 is rotated in the appropriate direction and the reaction force/torque will raise inside the torsion spring 8 and consequently the output force/torque applied to the external load (not shown) through the output shaft 11 will also increase. Again, sensor 29 will measure the force/torque until the desire force/torque is reached and sensor 59 will measure the corresponding angular motion.

The embodiment of FIGS. 18 and 19 presents, amongst others, the following advantages:

Since a force/torque is applied to the external load (not shown) through the output shaft 11 and the transducer T2 against a force/torque produced by transducer T1, and since a force/torque applied by the external load (not shown) to the output shaft 11 is compensated for at least in part through transducer T1 to make easier compensation of this force/torque and the corresponding angular motion through transducer T2, the mechanical differential along with the transducers T1 and 72 define a dynamic relationship between force/torque and speed applied to the load at the mechanical port connected to this load.

This allows transducers T1 and 72 along with the mechanical differential to accurately and efficiently adjust the force/torque and angular speed applied to the external load through the output shaft, as well as to efficiently and accurately compensate for a force/torque and angular speed induced to the output shaft 11 by the same external load. In this manner, an interaction of a port of a robot on a load can be accurately and efficiently controlled.

The differential actuator of FIGS. 18 and 19 constitutes a high performance actuator of compact design. This actuator is particularly, but not exclusively, well suited for integration in robotic mechanisms.

Although differential coupling between an intrinsically high impedance transducer T1 and an intrinsically low impedance transducer T2 provides similar benefits as serial coupling of the transducers, differential coupling enables interesting more compact and simple design implementation possibilities in particular, but not exclusively, for rotational actuators.

In a differential actuator such as the one shown in FIGS. 18 and 19, the mechanical impedance $Z_2$ of transducer T2, which is in general very difficult to model, does not influence the mechanical impedance $Z_{eq}$ of the differential actuator. As a result, an interaction control between the differential actuator and the load can be performed solely with impedance and/or force/torque control of transducer T1.

Figure 20:
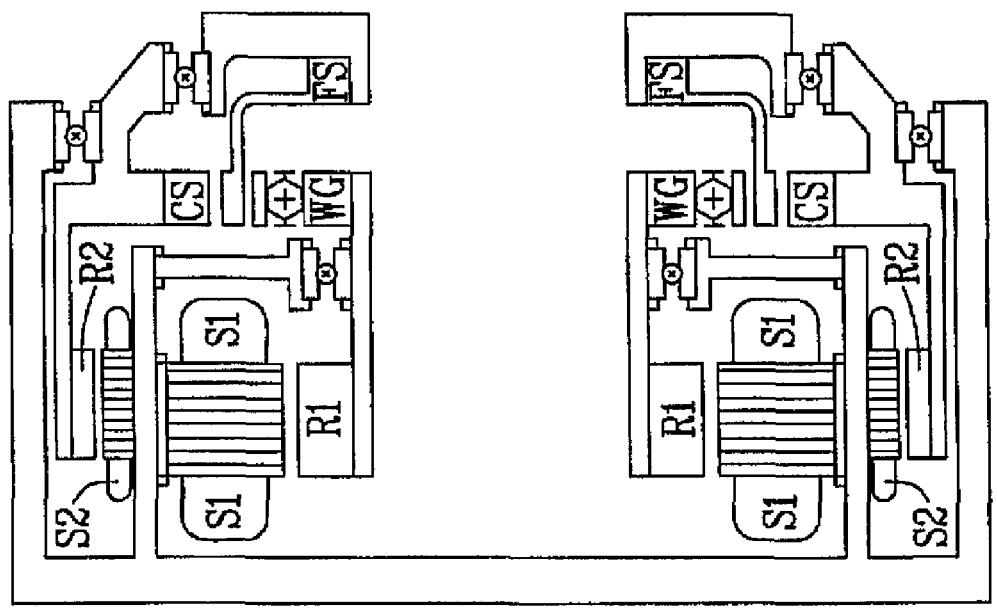
FIG. 20 is schematic diagram of a force controllable differential actuator according to an illustrative embodiment of the present invention, with variable and controllable impedance dynamic reaction.

Implementation of a force controllable differential actuator with variable and controllable impedance dynamic reaction The embodiment shown in FIG. 20 uses a hollow shaft harmonic drive WG-FS-CS to implement a differential coupling between an unlimited angle direct drive brushless motor R1-S1 and a limited angle direct drive brushless torque motor R2-S2. An example of company that manufactures limited and unlimited angle torque motors is the American company Axsys [12]. Limited angle torque motors have only one stator winding. They do not need complex commutation electronics and they have a clean torque output without ripple. The key point to understand the advantage of using limited angle torque motors is that compared to unlimited angle brushless direct drive torque motors of the same size, limited angle torque motors can produce higher torques within a large frequency bandwidth (from stationary to high frequencies) because the winding current interact with all the rotor magnets at the same time. The mechanical volume occupied by limited angle or unlimited angle torque motor has the geometry of a tore. In the design of FIG. 20, the rest of the differential actuator mechanism advantageously fits within the free space at the center of the tore allowing the construction of a compact unlimited angle high performance actuator combining all the advantages of the limited angle torque motor (i.e. very high torque output within a large frequency bandwidth, very low intrinsic mechanical impedance, direct force controllability) and the principal advantage of the central unlimited angle direct drive motor (unlimited angle rotation capability).

Controlling the output torque/torque can be done either by using a force transducer and a feedback controller or by controlling the winding current using a feed forward model based on the position state feedback of the rotor R2. One advantage of this second control scheme is that the transducer winding and the current sensor are collocated allowing very fast analog control of the torque. An appropriate speed control of the unlimited angle motor ensures that the limited angle torque motor stays inside its functional range of angle displacement.

The above described illustrative embodiments of the present invention are particularly, but not exclusively, suitable for compact implementation designs of high performance actuators which are especially adapted for integration in robotic mechanisms. Many robotic tasks that require a precise interaction control between a robot and the robot's environment can benefit from these designs. The application fields are numerous, including, amongst others:

Actuation of active suspension mechanisms for robotic vehicles (from rovers to legged robots);
Actuation of robotic arms for fast assembly tasks;
Actuation of safe robotic arms working in human environments;
Actuation of robots for surgery;
Actuation of limbs for humanoids robots;
Actuation of hyper motorized robotic mechanisms;
Actuation of human exoskeleton for gesture assistance (arm, hand);
Actuation of human exoskeleton for physiotherapy;
Actuation of physiotherapy robot;
Actuation of massage robot;
Actuation of a robot for polishing;
Actuation of a robot for grinding;
Actuation of prostheses and ortheses for human limb assistance or replacement;
Any task wherein a robot interacts with an unknown environment;
Any robot that manipulates variable-shape objects in an unknown environment;
Actuation of force augmentation robots and exoskeleton (weight lifting devices); and
Actuation of haptic interfaces (tele-presence, tele-operation, virtual reality).

It is to be understood that the invention is not limited in its application to the details of construction and parts illustrated in the accompanying drawings and described hereinabove. The invention is capable of other embodiments and of being practiced in various ways. It should also be understood that the phraseology or terminology used herein is for the purpose of description and not limitation.

Hence, although the present invention has been described hereinabove by way of illustrative embodiments thereof, these non-restrictive illustrative embodiments can be modified at will, within the scope of the appended claims, without departing from the spirit and nature of the subject invention.

REFERENCES

[1] Hogan, N., Buerger, S. P. (2005), <<Impedance and Interaction Control>>, *Robotics and Automation Handbook*, CRC Press, pp. 19.1-19.24.

[2] Fasse, E. D., Hogan, N., Gomez, S. R., Mehta, N. R. (1994), <<A novel Variable Mechanical Impedance Electromechanical Actuator>>, *Dynamic Systems and Control*, DSC Vol. 55-1, Volume 1, pp. 311-318.

[3] Aghili, F., Buehler, M., Hollerbach, J. M., (<Development of a High Performance Direct-Drive Joint>, Journal of Advanced Robotics, 16(3):233-250, 2002.

[4] Robinson, D. (2000), <<Design and Analysis of Series Elasticity in Closed Loop Actuator Force Control>>, PhD Dissertation, Massachusetts Institute of Technology, Cambridge, Boston.

[5] Bicchi, A., Tonietti, G., Bavaro, M., Piccigallo, M., <<Variable Stiffness Actuators for Fast and Safe Motion Control>>, in B. Siciliano, O. Khatib, and F. C. A. Groen, editors, Proceedings of ISRR 2003, Springer Tracts in Advanced Robotics (STAR). Springer Verlag, 2003.

[6] Zhou W., Chew, C.-M., Hong, G.-S., <<Property Analysis for Series MR-Fluid Damper Actuator System>>, Proceedings of IEEE Conference on Robotics, Automation and Mechatronics (RAM), Singapore, 1-3 Dec. 2004, pp. 560-565.

[7] Zinn, M., Khatib, O., Roth, B., Salisbury, J. K., <<Playing it safe: human-friendly robots>>, Robotics & Automation Magazine, IEEE Volume 11, Issue 2, June 2004, pp. 12-21.

[8] Morrel, J. B., <<Parallel Coupled Micro-Macro Actuators>>, Ph. D. thesis 1563, MIT—Artificial Intelligence Laboratory, 1996.

[9] Pratt et al., <<Elastic actuator for precise force control>>, U.S. Pat. No. 5,650,704, Jul. 22, 1997.

[10] Chew, C.-M., Hong, G.-S. and Zhou, W., <<Series damper actuator for force/torque control>>, United States Patent Provisional Application, Application No. 60/469,825.

[12] Company Axsys website: www.axsys.com.

What is claimed is:

1. A mechanical differential actuator for interacting with a mechanical load comprising:
 a first transducer;
 a second transducer; and
 a mechanical differential having three interaction ports, including a first interaction port coupled to the first transducer, a second interaction port coupled to the second transducer, and a third interaction port coupled to the load;
 wherein:
 the mechanical differential actuator is characterized by an equivalent impedance $Z_{eq}$;
 the first transducer is characterized by a first mechanical impedance $Z_1$;
 the second transducer is characterized by a second mechanical impedance $Z_2$; and
 the second mechanical impedance $Z_2$ is sufficiently large compared to the first mechanical impedance $Z_1$ that the second mechanical impedance $Z_2$ does not influence significantly the equivalent mechanical impedance $Z_{eq}$ of the mechanical differential actuator.

2. A mechanical differential actuator as recited in claim 1, wherein:
 the mechanical differential is characterized by a force amplification factor K ; and $$(K+1)^2 Z_2 >> Z_1.$$

3. A mechanical differential actuator as recited in claim 2, wherein:

$$Z_{eq} \cong \frac{K^2}{(K+1)^2} Z_1.$$

4. A mechanical differential actuator as recited in claim 1, wherein the first transducer comprise a source of force.

5. A mechanical differential actuator as recited in claim 4, wherein the first transducer comprises a controller of the source of force.

6. A mechanical differential actuator as recited in claim 4, wherein the source of force comprises an element selected from the group consisting of a magneto-rheological damper, an electro-rheological damper, a magnetic particle brake, a magnetic brake based on a hysteresis effect, a stack of piezo-electric actuators acting on friction plates, a mechanism acting as a variable stiffness spring and a direct electromechanical transducer controlled with a feedback of movement state variables of the first transducer.

7. A mechanical differential actuator as recited in claim 4, wherein the source of force comprises an element selected from the group consisting of a force-controlled direct drive electromechanical transducer and a force-controlled pneumatic transducer.

8. A mechanical differential actuator as recited in claim 4, wherein the first transducer comprises a variable and a controllable impedance element in parallel with the source of force.

9. A mechanical differential actuator as recited in claim 8, wherein the first transducer is integrated around the stator.

10. A mechanical differential actuator as recited in claim 1, wherein the second transducer comprises a source of speed.

11. A mechanical differential actuator as recited in claim 10, wherein the second transducer comprises a controller of the source of speed.

12. A mechanical differential actuator as recited in claim 10, wherein the source of speed comprises an element selected from the group consisting of a hydraulic transducer, a direct drive electromechanical transducer having a feedback speed controller, and an ultrasonic actuator.

13. A mechanical differential actuator as recited in claim 1, wherein the mechanical differential comprises a first speed reducer mechanism for implementing a mechanical differential function, the first transducer being coupled to the first speed reducer.

14. A mechanical differential actuator as recited in claim 13, wherein the speed reducer mechanism comprises an element selected from the group consisting of a standard gearbox, a planetary gearbox, a cycloidal gearbox, a harmonic drive, a bar mechanism and a cable mechanism.

15. A mechanical differential actuator as recited in claim 13, wherein the mechanical differential comprises a second speed reducer mechanism for implementing a mechanical differential function, the second transducer being coupled to the second speed reducer.

16. A mechanical differential actuator as recited in claim 15, wherein the second speed reducer mechanism comprises an element selected from the group consisting of a standard gearbox, a planetary gearbox, a cycloidal gearbox, a harmonic drive, a bar mechanism and a cable mechanism.

17. A mechanical differential actuator as recited in claim 1, wherein the mechanical differential comprises microelectromechanical systems.

18. A mechanical differential actuator as recited in claim 1, wherein the first impedance is constant.

19. A mechanical differential actuator as recited in claim 18, wherein the first transducer comprises a passive mechanical element.

20. A mechanical differential actuator as recited in claim 19, wherein the passive mechanical element is selected from the group consisting of a passive mechanical spring, a passive mechanical damper, and a passive mechanical inertia.

21. A mechanical differential actuator as recited in claim 1, wherein the second transducer comprises a rotor, the first transducer comprises a moving end and is integrated inside the rotor, and the mechanical differential comprises a harmonic drive itself comprising:
- a flexible spline connected to the moving end of the first transducer;
- a wave generator connected to the rotor of the second transducer; and
- a circular spline acting as the third interaction port.

22. A mechanical differential actuator as recited in claim 1, wherein the second transducer comprises a rotor and a stator, the first transducer comprises a moving end and is integrated around the stator, and the mechanical differential comprises a harmonic drive itself comprising:
- a flexible spline connected to the moving end of the first transducer;
- a wave generator connected to the rotor of the second transducer; and
- a circular spline acting as the third interaction port.

23. A mechanical differential actuator as recited in claim 1, wherein the mechanical differential comprises a speed reducer mechanism for implementing a mechanical differential function, the first and second transducers being coupled to the speed reducer.

24. A mechanical differential actuator as recited in claim 23, wherein the speed reducer mechanism comprises an element selected from the group consisting of a standard gearbox, a planetary gearbox, a cycloidal gearbox, a harmonic drive, a bar mechanism and a cable mechanism.

25. A mechanical differential actuator as recited in claim 1, wherein the differential comprises a first and second speed reducers, wherein both speed reducers are implemented using similar physical components.

26. A method of actuating a mechanical load comprising:
- providing a mechanical differential having three interaction ports;
- providing a first transducer;
- providing a second transducer;
- coupling the first transducer to a first interaction port of the mechanical differential;
- coupling the second transducer to a second interaction port of the mechanical differential;
- coupling the load to a third interaction port of the mechanical differential;
- characterizing the first transducer by a first mechanical impedance $Z_1$;
- characterizing the second transducer by a second mechanical impedance $Z_2$;
- characterizing the mechanical differential actuator by an equivalent mechanical impedance $Z_{eq}$; and
- choosing the second mechanical $Z_2$ impedance sufficiently large compared to the first mechanical impedance $Z_1$ so that the second mechanical impedance $Z_2$ does not influence significantly the equivalent mechanical impedance $Z_{eq}$ of the mechanical differential actuator.

27. A method of actuating a mechanical load as recited in claim 26, wherein:
the mechanical differential is characterized by a force amplification factor K ; and $$(K+1)^2 Z_2 >> Z_1.$$

28. A method of actuating a mechanical load as recited in claim 27, wherein:

$$Z_{eq} \cong \frac{K^2}{(K+1)^2} Z_1.$$

29. A method of actuating a mechanical load as recited in claim 26, wherein the first transducer comprises a source of force.

30. A method of actuating a mechanical load as recited in claim 26, wherein the second transducer comprises a source of speed.

31. A mechanical differential actuator as recited in claim 26, wherein the differential comprises a first and second speed reducers, and wherein said method further comprises:
- coupling the first transducer to the first speed reducer;
- coupling the second transducer to both the first and second speed reducers; and
- coupling the load to one of the second speed reducer.

32. A mechanical differential actuator as recited in claim 26, comprising:
maintaining the first impedance constant.

33. A method of actuating a mechanical load as recited in claim 32, further comprising:
integrating the first transducer inside the rotor.

34. A method of actuating a mechanical load as recited in claim 32, comprising:
integrating the first transducer around the stator.

35. A method of actuating a mechanical load as recited in claim 26, wherein the first transducer comprises a moving end, the second transducer comprises a rotor, the mechanical differential comprises a harmonic drive including a wave generator, a flexible spline and a circular spline, and wherein said method further comprises:
- connecting the flexible spline to the moving end of the first transducer;
- connecting the rotor to the wave generator; and
- using a circular spline as the third interaction port.

* * * * *